United States Patent [19]

Feist et al.

[11] Patent Number: 5,236,597
[45] Date of Patent: Aug. 17, 1993

[54] SORPTION OF CARBOXYLIC ACIDS BY MEANS OF RUBBER

[75] Inventors: Heinz R. Feist, Greenwich, Conn.; Werner Legat, Hanover, Fed. Rep. of Germany; Hans-Walter Swidersky, Hanover, Fed. Rep. of Germany; Matthias Rieland, Hanover, Fed. Rep. of Germany; Thomas Born, Holle, Fed. Rep. of Germany; Andrea Feldmann, Garbsen, Fed. Rep. of Germany

[73] Assignee: Solvay Umweltchemie GmbH, Hanover, Fed. Rep. of Germany

[21] Appl. No.: 986,292

[22] Filed: Dec. 7, 1992

[30] Foreign Application Priority Data

Sep. 18, 1992 [DE] Fed. Rep. of Germany ....... 4231258

[51] Int. Cl.$^5$ ............................................... C02F 1/58
[52] U.S. Cl. ..................... 210/670; 210/683; 210/691; 210/692
[58] Field of Search ................ 210/670, 683, 691, 692

[56] References Cited

U.S. PATENT DOCUMENTS 3,954,690  5/1976  Hesse et al. ................ 527/602
4,182,677  1/1980  Bocard et al. .............. 210/680

FOREIGN PATENT DOCUMENTS 256294  9/1992  European Pat. Off. .
4029892  3/1990  Fed. Rep. of Germany .
3923299  1/1991  Fed. Rep. of Germany .
1102216  2/1968  United Kingdom .

Primary Examiner—Stanley S. Silverman
Assistant Examiner—Cynthia L. Nessler
Attorney, Agent, or Firm—Foley & Lardner

[57] ABSTRACT

A method of using rubber, preferably from tire recycling, for absorbing organic carboxylic acids containing from 1 to 3 carbon atoms optionally substituted with from 1 to 5 halogen atoms. Trifluoroacetic acid, for example, can be absorbed very effectively.

6 Claims, No Drawings

SORPTION OF CARBOXYLIC ACIDS BY MEANS OF RUBBER

BACKGROUND OF THE INVENTION

This invention relates to the use of rubber as a sorbent for carboxylic acids, particularly lower carboxylic acids containing from one to three carbon atoms and/or lower carboxylic acids substituted by from one to five halogen atoms.

The sorption of lower alkyl carboxylic acids optionally substituted with halogen, such as acetic acid and/or trifluoroacetic acid, has long been carried out by using active carbon.

SUMMARY OF THE INVENTION

It is the object of the invention to provide a new sorbent which can be used for absorbing lower alkyl carboxylic acids or lower alkyl carboxylic acids substituted by halogen.

It is also an object of the invention to provide a new process for absorbing lower carboxylic acids and/or lower carboxylic acids substituted by halogen.

Another object of the invention is to provide an advantageous use for waste rubber material, such as recycled tire rubber.

These and other objects are achieved in accordance with the present invention by providing a method of absorbing organic carboxylic acids containing 1 to 3 carbon atoms optionally substituted with from 1 to 5 halogen atoms, wherein the method comprises contacting said carboxylic acids with rubber.

DETAILED DESCRIPTION OF PREFERRED EMBODIMENTS

Surprisingly, it has been found that lower carboxylic acids which are unsubstituted or are substituted by halogen can be absorbed by using rubber as a sorbent.

The invention thus relates to use of rubber for the sorption of organic carboxylic acids with 1 to 3 carbon atoms, optionally substituted with 1 to 5 halogen atoms.

Rubber is used to absorb organic carboxylic acids preferably containing 2 or 3 carbon atoms, which can be substituted if desired with 1 to 3 halogen atoms. It is particularly preferred to use rubber to absorb carboxylic acids containing two carbon atoms, especially acetic acid, fluoroacetic acid, difluoroacetic acid or trifluoroacetic acid. Rubber is especially suitable as a sorbent for trifluoroacetic acid.

As used herein, the term, "rubber" includes in particular either natural or synthetic rubber. Vulcanized rubber is especially preferred. The rubber may be vulcanized to a greater or lesser extent and accordingly more or less hard. Rubber containing commonly used additives such as vulcanization accelerators, plasticizers, fillers, etc., can be used.

The rubber may be, for example, scrap rubber from rubber manufacture or waste rubber, for example from rubber components from automobile tires, tubes or the like from recycling programs. In addition to the use of scrap and waste rubber, it is possible, of course, to use as the starting material rubber that is made and formed especially for the purposes of the invention.

The rubber can be used in various forms. For example, it can be used in the form of small particles, e.g. in powder form, or in the form of hot-pressed shapes, or in the form of chips. For example, rubber, e.g., scrap rubber or the rubber components of automobile tires, tubes or the like, can be chopped up, broken or ground, and the resulting comminuted rubber or rubber powder, can be used as starting material. The rubber powder produced during the preparation of tires for recapping can also be used.

Furthermore, the rubber can be used in the form of mossy rubber or also in flat form, for example in the form of sheets or bands. Textured rubber, especially textured rubber used in sheet form, advantageously has an especially large surface area. The rubber can also be used in the form of a web or fabric. Rubber in the form of a continuous rubber band or a fabric in band form enables the sorption process to be carried out continuously. In such a case, a person skilled in the art can proceed in a manner similar to that described in Published German Patent Application No. DE 40 29 892, in which a continuous, endless rubber belt is circulated around pulleys. The substance to be absorbed or a mixture containing the substance to be absorbed is fed onto the slowly circulating belt. The sorbed material adheres to or in the rubber belt, and material which is not sorbed can be removed from the belt by a scraper or by passing the belt around a pulley. The sorbed material can be desorbed from the rubber belt at another point by heating, for example with hot steam. The regenerated rubber belt can then be reused.

If, in accordance with another embodiment, rubber in particulate or powder form is used, e.g. shredded rubber from tire recycling and/or powdered rubber from tire recapping, it is also possible to regenerate the rubber, for example with hot steam.

The method of the invention can be used for absorbing carboxylic acids from exhaust air or from solutions of high or low concentration, including, for example, waste water. Waste water from some production processes may contain carboxylic acids such as trifluoroacetic acid, for example. Furthermore, accidents may cause carboxylic acids to be spilled and contaminats industrial premises or to get into water supplies or waste water. Rubber absorption is highly suitable for dealing with precisely such emergencies after a spill. Using previously known sorbents, it may not be possible to absorb carboxylic acids from water.

As previously mentioned, the method of the invention is highly suitable for absorbing spilled carboxylic acids. Furthermore, pipelines, valves, couplings, various apparatus and parts of apparatus, etc., through which carboxylic acids might escape, can be covered with rubber. It is understood to be within the scope of the invention to take precautions against the spread of carboxylic acids in the environment due to possible leakage by providing various parts or devices with sorbent rubber coverings or the like.

It is already known from published German Patent Application No. DE 39 23 299 that rubber can be used to absorb nonpolar organic compounds, such as aliphatic, aromatic and chlorinated hydrocarbons, for example. It is surprising, however, that polar compounds like organic carboxylic acids can be absorbed by rubber.

It is another advantage that the sorbed acid can be desorbed almost quantitatively by simple heating or by vacuum treatment. Both the sorbent and the acids which are released in concentrated form, are reusable. This is hardly possible if active carbon is used as the sorbent.

The following examples are intended to further illustrate the invention without limiting its scope.

EXAMPLE 1

Absorption of a Mixture of Trifluoroacetic Acid and Acetic Acid 100 g of a mixture of trifluoroacetic acid and glacial acetic acid (50 wt.-% each) was added to 4.9 g of rubber powder and shaken. No swelling of the rubber powder was observed. The rubber was subsequently filtered out and aspirated dry. The dried rubber powder, which had a flaky appearance, contained 10.4 g of sorbate. According to a gas chromatogram and various NMR spectra, the sorbate proved to be a mixture of equal parts of trifluoroacetic acid and acetic acid.

EXAMPLE 2

Sorption of Trifluoroacetic Acid 100 g of 99.9% pure trifluoroacetic acid was added to 5.2 g of rubber powder and shaken. The mixture was allowed to stand for 5 minutes, while the rubber powder was visibly absorbing trifluoroacetic acid. The rubber powder was then filtered out and aspirated dry. The rubber was found to have absorbed 32.9 g of trifluoroacetic acid.

EXAMPLE 3

Sorption of Trifluoroacetic Acid From Aqueous Solution 110 g of a solution of trifluoroacetic acid in water (50 wt.-% trifluoroacetic acid; 50 wt.-% $H_2O$) was added to 5.1 g of rubber powder. Upon shaking, it was found that the rubber swelled up and floated on the aqueous phase. The rubber was filtered out and aspirated dry. The rubber powder was found to contain 8.5 g of sorbate. This experiment proves that trifluoroacetic acid can also be sorbed from of aqueous solutions.

The foregoing description and examples have been set forth merely to illustrate the invention and are not intended to be limiting. Since modifications of the described embodiments incorporating the spirit and substance of the invention may occur to persons skilled in the art, the invention should be construed to include all variations and modifications falling within the scope of the appended claims and equivalents.

What is claimed is:

1. A method of absorbing organic carboxylic acids containing 1 to 3 carbon atoms from waste fluids, said carboxylic acids being selected from the group consisting of unsubstituted carboxylic acids and carboxylic acids substituted with from 1 to 5 halogen atoms, said method comprising contacting said carboxylic acids with rubber.

2. A method according to claim 1, wherein the carboxylic acid contains 2 or 3 carbon atoms.

3. A method according to claim 2, wherein the carboxylic acid is an organic carboxylic acid containing two carbon atoms selected from the group consisting of acetic acid, fluoroacetic acid, difluoroacetic acid and trifluoroacetic acid.

4. A method according to claim 1, wherein said rubber is in powder form.

5. A method according to claim 1, wherein said rubber is rubber from tire recycling.

6. A method according to claim 1, further comprising the steps of desorbing said carboxylic acids from said rubber and recycling said rubber to the absorption step.

* * * * *